Jan. 29, 1935.　　　F. INGEMARSON　　　1,989,361

FREEWHEELING AND POSITIVE GEAR CONTROL MECHANISM

Filed Feb. 2, 1931　　　2 Sheets-Sheet 1

Inventor
Franc Ingemarson,
By Thorpe & Thorpe
Attorneys

Jan. 29, 1935.  F. INGEMARSON  1,989,361
FREEWHEELING AND POSITIVE GEAR CONTROL MECHANISM
Filed Feb. 2, 1931  2 Sheets-Sheet 2
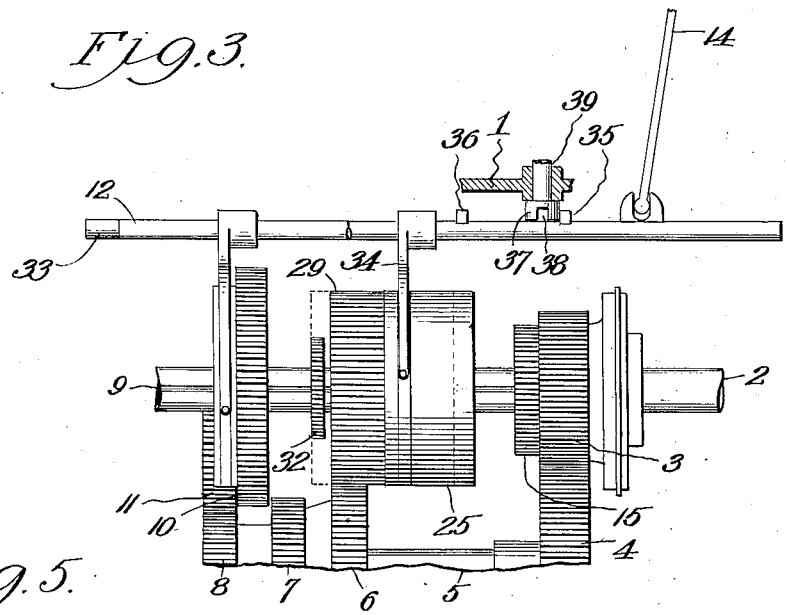
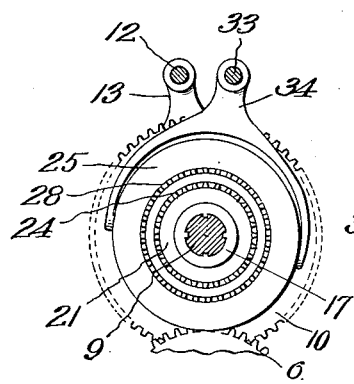
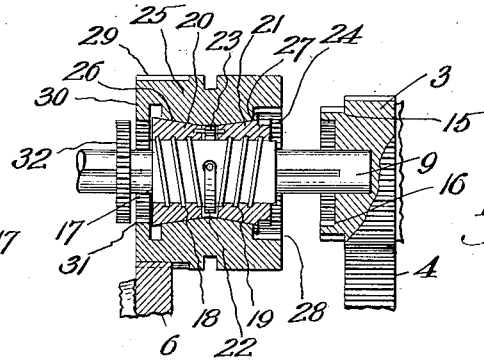
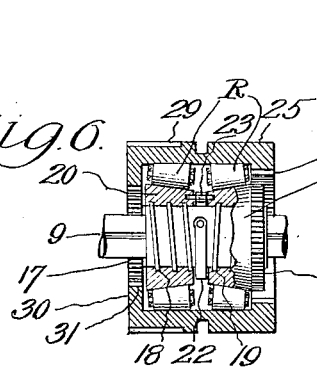
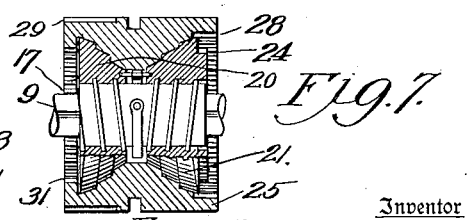
Inventor
Franc Ingemarson Patented Jan. 29, 1935

1,989,361

UNITED STATES PATENT OFFICE 1,989,361

FREEWHEELING AND POSITIVE GEAR CONTROL MECHANISM

Franc Ingemarson, Kansas City, Mo.

Application February 2, 1931, Serial No. 512,846

4 Claims. (Cl. 192—48)

This invention relates to motor car transmission gearing of that class providing for what is known as free wheeling and for positive gear control in high and second speed travel, and my object is to provide a construction of the character specified, which is efficient and dependable in operation and of simple, strong, durable and inexpensive construction.

With this object in view, the invention consists in certain novel and useful features of construction and combinations of parts as hereinafter described and claimed; and in order that it may be fully understood, reference is to be had to the accompanying drawings, in which:—

Figure 3 is a fragmentary view similar to Figure 1, but with the parts positioned for free-wheeling in second gear.

Figure 4 is a fragmentary central longitudinal section, with the parts positioned for free-wheeling in second gear.

Figure 5 is a vertical section on the line V—V of Figure 1.

Figure 6 is a fragmentary longitudinal section of a modified form of operative connection between the free-wheeling clutch housing and conical collar elements.

Figure 7 is a longitudinal section of a second modified form of operative connection between the clutch housing and conical collar elements.

Figure 1:
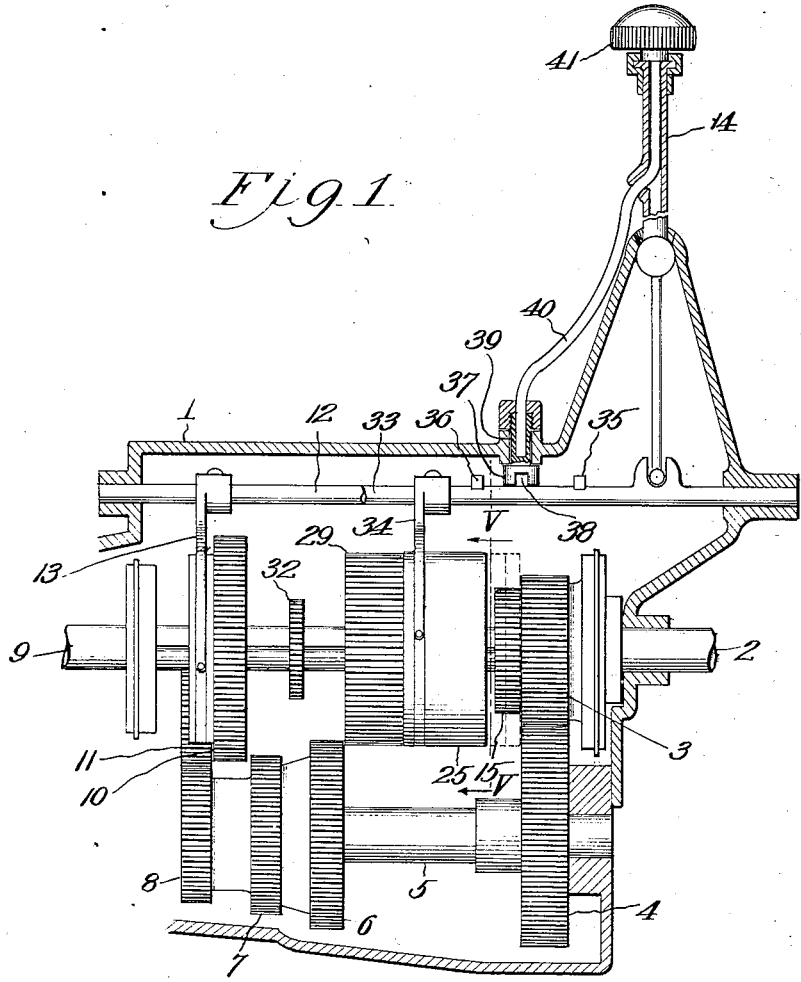
Figure 1 is a side elevation of a transmission gearing embodying the invention, as arranged or set in neutral position.
Figure 2:
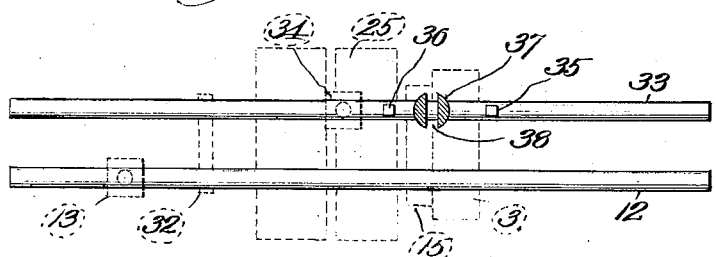
Figure 2 is a fragmentary plan view, with a stop member for the high and second gear slide rod, shown in horizontal section, and the relative position of the free-wheeling clutch mechanism and second gear mechanism indicated in dotted line position.

In the said drawings, 1 indicates the transmission case, and 2 the shaft driven from the motor, not shown, and rotatable with said shaft, which is here shown as being driven in such direction that when engaged with the housing 25 will engage certain clutch faces hereinafter identified, namely, anti-clockwise, is the drive gear 3, engaging the gear 4 on the counter-shaft 5, equipped with three gear wheels 6, 7 and 8. The shaft 9 leading to the differential, not shown, is alined with shaft 2 and suitably journaled, and splined on shaft 9, is an adjustable gear 10, to be shifted into engagement with gear 7 to drive in first or low gear or into engagement with the suitably journaled reverse gear 11, enmeshed with gear 8, when it is desired to back the car, the disposal of gear 10 in a plane between the gears 7 and 11, being its neutral position.

The shift rod 12 for adjustment of the gear 10 through the yoke 13, to hold or set the gearing in neutral, low or reverse, is actuated by the shift lever 14 in the customary manner. All of the parts as thus far described are of conventional arrangement, and only those which have any bearing or use for free-wheeling or positive gear control in second or high will be hereinafter referred to.

The drive gear 3 is provided with an external gear 15 and internal teeth 16, and between said drive gear and gear 10 is a clutch mechanism. As a part of said mechanism, there is a sleeve 17 splined on shaft 9 for rotation therewith and sliding adjustment thereon, said sleeve having reversed sets of worm threads 18 and 19. A pair of conical collars 20 and 21 fit upon the sleeve and are respectively engaged with the worm threads 18 and 19, and a spring 22 encircles the sleeve between the collars and is secured at one end to the sleeve and provided at its opposite end with a pin 23 fitting at its opposite ends in the adjacent ends of the respective collars. The spring tends to resist independent rotative movement of either the sleeve or the collars, and to restore the said parts to initial relation when unopposed.

The collars taper toward each other and the forward one is provided with teeth 24 for engagement with the teeth 16 of drive gear 3, to give positive gear control in high, as hereinafter more particularly described.

Fitted around the conical collars and adapted to have either a driving or a driven relation thereto at times, is a cylindrical housing 25. As shown, the housing is provided with a pair of tapered inner walls 26 and 27, which respectively are adapted for engagement with collars 20 and 21, or with antifriction rollers R, interposed between the housing and collars, as in the modification disclosed by Figure 6. The housing has internal teeth 28 for engagement with teeth 15 of drive gear 3, when free-wheeling travel in high is desired, and for such engagement in conjunction with the engagement of teeth 16 of said gear wheel by the teeth 24 of collar 21 when positive gear control in high is desired. The housing also has external gear teeth 29 for engagement with gear wheel 6 when free-wheeling travel in second is desired, and has an inwardly-projecting flange 30 provided with internal teeth 31, for engagement with a toothed wheel 32 rigidly secured on shaft 9, when positive gear control in second, is desired. In this connection it should be stated that the use of reversed threaded relations between the sleeve 17 and the collars thereof, is to provide resistance for end thrust in both directions, and that if end thrust is taken up by other means, there would be no necessity for the use of reversed threads on the sleeve.

The shift rod 33 is for use and operation by the shift lever, to throw the transmission into free-wheeling, second and high, and into positive gear control in second, and positive gear control in high, it being understood that the term positive gear control means that the motor is in control and will act as a brake in the event the conventional clutch (not shown) is operative and the car tends to travel at a greater speed than that imparted to it by the motor, and said housing is adapted to be shifted forwardly or rearwardly on shaft 9 by means of a conventional yoke 34 projecting from shift rod 33.

The shift rod 33 has a pair of upstanding spaced lugs 35 and 36, and between them is a stop 37. When the shift lever is pushed forward to throw the car into second gear, stop 37 is in position to check the adjustment with the parts in free-wheeling second gear position, and when the shift lever is pulled back to throw the car into high gear, the stop is likewise in position to check the adjustment with the parts in free-wheeling high gear position.

When it is desired to set the transmission in positive gear control in second or high, it is necessary to continue the rearward or forward sliding action respectively of the rod 33. To permit of such continued or extended movement, the stop 37 is made rotatable and is provided with a slot 38, into which, when the stop is adjusted to dispose the slot from a transverse to a longitudinal position relative to the rod, either of said lugs may enter. To effect turning movement of the stop so that the slot shall extend transversely or longitudinally accordingly as it is desired that the car shall travel in free-wheeling or positive gear control, the stop has a stem 39 journaled in the transmission case, and the lower end of a flexible shaft 40 is secured to the stem. The other end of the shaft 40 extends into and up through the shift lever, and is secured at its upper extremity to a turn-knob 41 swivelled on the upper end of the lever. When the lever is operated from free-wheeling in second to free-wheeling in high, or vice versa, the lever is manipulated in the conventional manner without turning the knob so that the stop shall stand with its slot out of alinement with the lugs and thus prevent over-throw of the lever. When it is desired to obtain positive gear control, the knob is turned to aline the slot with the lugs so that free throw of the shift lever, in the desired direction, can be obtained.

When the shift lever is in neutral position, as shown in Figure 1, the housing occupies an intermediate position of adjustment and its various teeth are functionless.

Assuming the housing to be in the intermediate position and that it is desired to shift to free-wheeling in second, the shift lever is manipulated in the conventional manner to shift rod 33 rearward. This action shifts the housing in the same direction and disposes its external teeth 29 in mesh with the driven second gear 6 (see Figure 3), it being noted that the stop 37 between the lugs 35 and 36 on rod 33, arrests the said slide rod when the housing is properly engaged with the second gear 6. This puts the mechanism in free-wheeling second so that the car may travel under momentum acquired, at a speed in excess of the speed of shaft 2—driven from the motor—because the increased speed of shaft 9, causes the worm sleeve to crowd cone collars 20 and 21 in such a direction that said cone collars are withdrawn from driving frictional engagement with the inner wall of the housing. The latter, therefore, is free to spin under the driving force of second gear 6. In Figure 6, the action of the cone collars unclamps the anti-friction rollers R to obtain the same result.

In the event the driver desires to regain control of the car by the motor without manipulation of the conventional clutch, he turns the knob 41 and through the flexible shaft 40, rotates stop 37 until its slot 38 is in line with the lug 35, and as this action of the stop is effected, he forces the shift lever further forward and thereby slides the housing rearward on shaft 9, until its internal teeth 31 intermesh with teeth 32 on said shaft, this movement of the housing being effected without disengagement of its teeth from the countershaft gear 6. In moving the housing into engagement with teeth 32, power is transmitted from the motor and counter-shaft to the housing and thence to shaft 9, as explained, and provides for what is termed positive gear control in second. To restore the parts to second gear free-wheeling position, the shift lever is drawn back enough to again dispose lug 35 forward of the stop and disengage the housing from teeth 32, and if it is desired to travel with the parts thus arranged, the stop is turned back to its original position to guard against the chance of accidental further rearward movement of the shift rod 33.

If it is desired to shift from second to high gear in free-wheeling position, the shift lever is pulled back until lug 36 strikes the stop. This action causes the housing to move forward out of engagement with gear 6 to neutral and then continue forward until its teeth 28 are engaged with external teeth 15 of gear wheel 3, so that the housing shall turn at the same speed as gear 3. However, if the momentum of the car drives it at a greater speed than the gear wheel 3 imparts, the clutch automatically functions to break the driving relation between the sleeve 17 and the housing 25, so that the former may respond to the driving speed of shaft 9, and the housing member spin freely under the power of gear 3 as imparted by the speed of the engine.

By reference to Figure 6 it will be noted that the outer peripheries of the conical rollers R, parallel the inner circumferential wall of the housing. Because of the relation of said parts, the tendency of the collars to move inwardly (toward each other) under the force of the threaded sleeve, causes the rollers to move outwardly into clamping relation with the circumferential wall of the housing, so that the latter turns with and at the same speed as shaft 9, without any positive gear connection with either said shaft or the drive or counter-shaft. It will thus be noted that the rollers when in clamped relation to the housing serve to counteract end thrust of shaft 9 in both directions, and when relaxed or in unclamped relation to the housing, serve merely for antifriction purposes.

In Figure 7, the conical collars 20 and 21 are externally threaded, the peripheral surface of each thread being conical and providing an abrupt shoulder at its outer periphery or margin of greatest diameter, and it is also desirable that each peripheral or flat thread surface be of slightly different taper or angle, the taper of the smallest thread being the greatest and that of the largest thread being the least, and the internal threads of the housing conform to the threads of the collars. By this arrangement the clutching and unclutching actions of the collars and housing are more instantaneous and effective, and the spiral threaded relation between the parts minimizes slippage or lost motion in the clutching action.

The construction of the clutch mechanism shown by Figure 7 functions as described when the housing is driven by the drive shaft in high or second. As the housing tends to turn on the collar and to turn the latter against the resistance of the spring, on the threaded sleeve, due to the resistance offered by the sleeve, the collar not only has a spiral wedging movement—if the thread of the collar is reversed to that of the sleeve, as preferred—which clamps it tightly to the housing, but also by reaction on the threads of the sleeve, is clamped in rigid relation to the shaft 9. It will be obvious that if the housing is geared to the driven shaft, but the speed of the latter is less than that of the other shaft, the rotation of the sleeve will tend to reverse the rotation of the collar and cause it to start to unscrew from and slidingly release the more slowly rotating housing, thus permitting overrunning or free-wheeling action of the second shaft.

It will be apparent from the foregoing, that when the automatic clutch mechanism is in declutched condition, either in high gear (teeth 15 and 28 enmeshed), or second gear (teeth 29 and gear 6 enmeshed), the motor exercises no control for braking purposes, but that when the adjustment of the clutch is sufficient to also establish an interlocked relation between teeth 24 of the collar 21 and teeth 16, or of the teeth 31 of the housing and the toothed wheel 32, a positive gear control is established and the motor serves to perform its driving function or its braking function, if the speed of the shaft 9 exceeds the speed of the motor driven shaft 2. It will also be apparent that the invention is susceptible of modification within the principle of construction and mode of operation described, and while I have described and claimed the preferred embodiment of the invention I reserve the right to make all changes within the spirit of the invention and without the ambit of the prior art.

I claim:—

1. The combination of a driving shaft, a second shaft, and a clutch mechanism comprising an externally threaded sleeve keyed to slide on and rotate with the second shaft, a conical collar threaded on the sleeve and provided with an external thread, and a housing fitting around the conical sleeve and internally tapered and threaded and engaging and conforming to the external taper and threads of the collar.

2. The combination of a driving shaft, a second shaft, and a clutch mechanism comprising an externally threaded sleeve keyed to slide on and rotate with the second shaft, a conical collar threaded on the sleeve and provided with an external thread, a housing fitting around the conical sleeve and internally tapered and threaded and engaging and conforming to the external taper and threads of the collar, and means for effecting a positive gear control connection between the two shafts by shifting the housing into clutched relation with the driving shaft.

3. In transmission gearing, a shaft, a sleeve keyed to slide on and turn with said shaft and provided with reversed external threads, a pair of conical collars on the sleeve and bearing a threaded relation with the respective threads of the sleeve, a housing fitting around the collars and of cylindrical form circumferentially, and two sets of conical rollers interposed between the circumferential wall of the housing and the respective collars and engaging and conforming at their innermost points to the taper of the collars and engaging and conforming at the outer points of their peripheries to the cylindrical inner wall of the housing.

4. In an overrunning clutch mechanism, the combination with a shaft, a pair of conical clutch members threaded for longitudinal movement on said shaft, a housing for said clutch members in association with tapered portions for cooperative engagement with the conical clutch members, teeth formed on one end of one of said clutch members, internal teeth at opposite ends of said housing spaced from the clutch members, and external teeth on said housing at its end opposite from said toothed clutch member.

FRANC INGEMARSON.